US005489016A

United States Patent [19]
Welch

[11] Patent Number: 5,489,016
[45] Date of Patent: Feb. 6, 1996

[54] PUSHER BAR APPARATUS TO REMOVE CONTAINERS FROM A SPLICE PLATE BETWEEN CONVEYORS

[75] Inventor: Thomas E. Welch, Arvada, Colo.

[73] Assignee: Technical Industrial Development Enterprises, Inc., Glenwood Springs, Colo.

[21] Appl. No.: 346,494

[22] Filed: Nov. 29, 1994

[51] Int. Cl.$^6$ .................................................. B65G 1/00
[52] U.S. Cl. .................. 198/347.2; 198/718; 198/468.11
[58] Field of Search ............................. 198/347.2, 347.3, 198/370.07, 370.08, 468.11, 572, 718, 728

[56] References Cited

U.S. PATENT DOCUMENTS

| | | | |
|---|---|---|---|
| 3,353,651 | 11/1967 | Witmer | 198/347.2 |
| 3,442,401 | 10/1969 | Wolfe et al. | |
| 3,465,868 | 12/1969 | Donner | |
| 3,669,241 | 6/1972 | Chalich | |
| 3,837,466 | 9/1974 | Jones | 198/347.2 |
| 3,923,146 | 12/1975 | Van Hall | 198/347.3 |
| 4,574,938 | 3/1986 | Orlandi | 198/347.3 |
| 4,756,400 | 7/1988 | Funo et al. | 198/468.11 X |
| 5,038,916 | 8/1991 | Quilliou | 198/468.11 X |

Primary Examiner—James R. Bidwell
Attorney, Agent, or Firm—Dorr, Carson, Sloan & Birney

[57] ABSTRACT

An apparatus for removing containers from a splice plate between two conveyors employs a sensor to indicate when substantially all of the containers have moved from the first conveyor onto the splice plate. A pusher bar assembly is then activated by the sensor to push any remaining containers on the splice plate onto the second conveyor. In one embodiment, the pusher bar assembly includes a first pair of pulleys mounted above and adjacent to opposite ends of the splice plate that are driven by a motor, a second pair of pulleys mounted a predetermined horizontal distance from the first pulleys, a pair of belts extending around the first and second pulleys, and a pusher bar secured between the belts so that the pusher bar moves with the belts in a path extending around the pulleys. The upper portion of this path allows the pusher bar to be moved out of the way, so as not to interfere with passage of the containers over the splice plate during normal operation of the conveyors. However, when triggered by the sensor, the motor moves the pusher bar through the lower portion of its path around the pulleys to push the containers from the splice plate and onto the second conveyor.

14 Claims, 4 Drawing Sheets

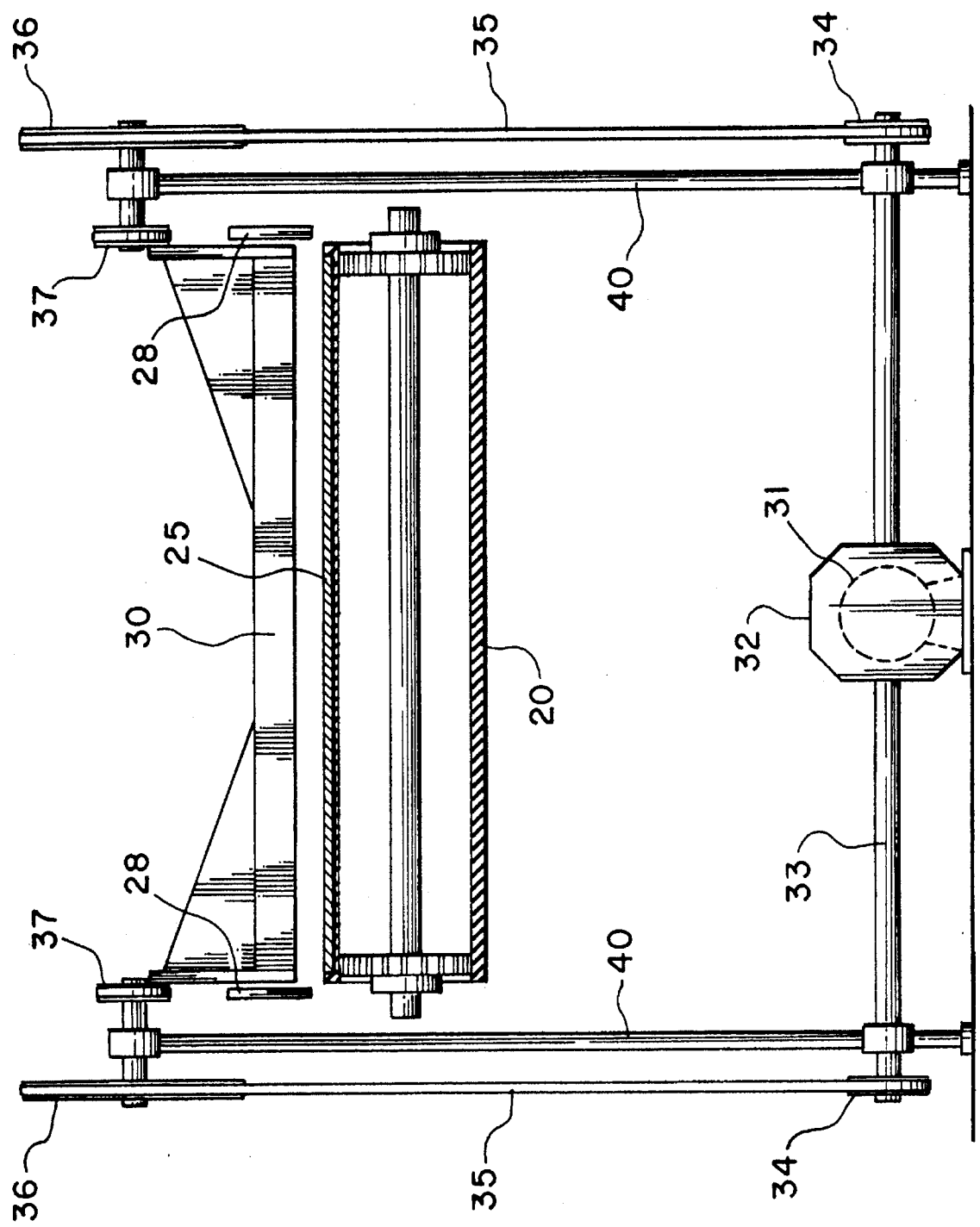

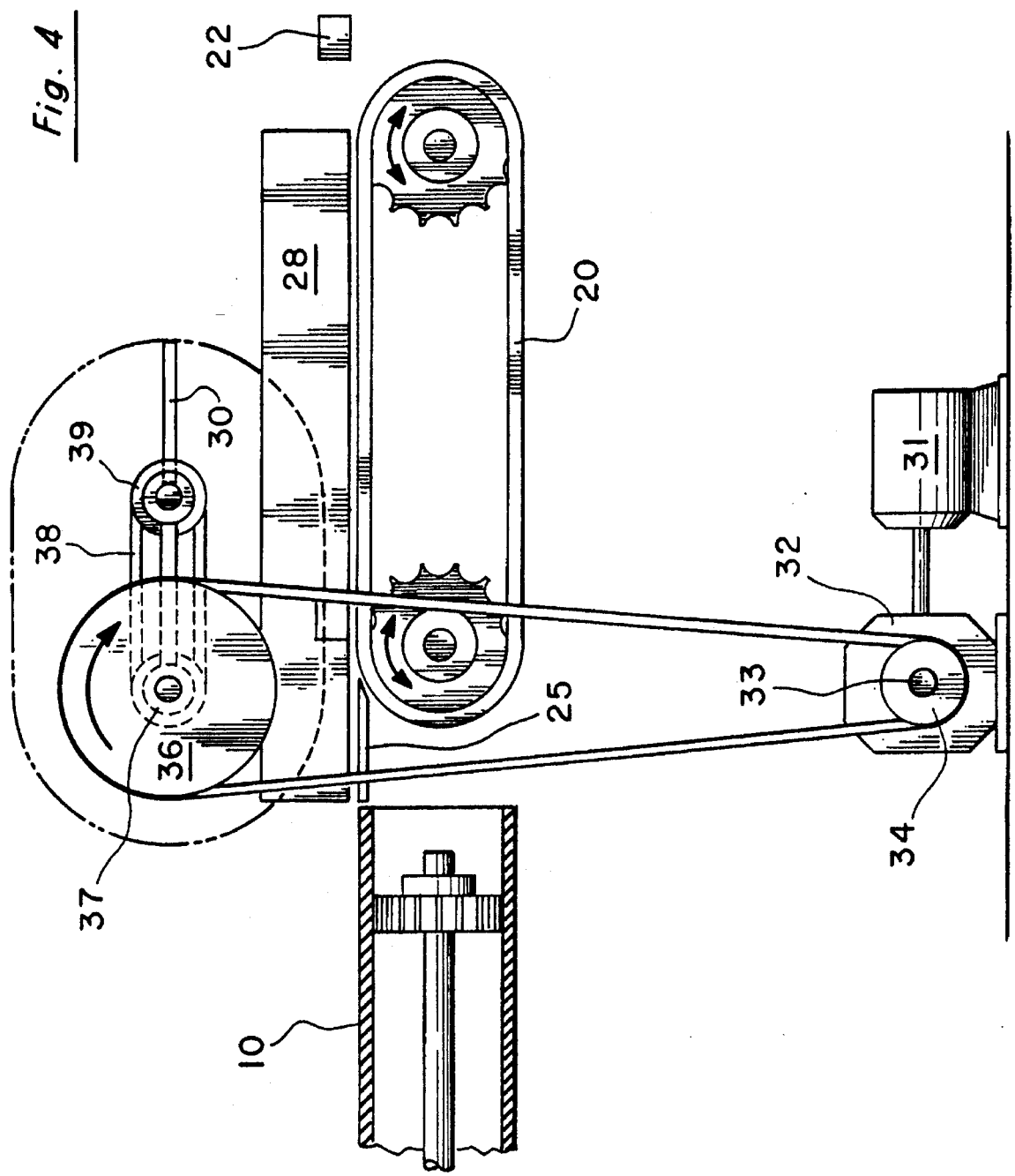

PUSHER BAR APPARATUS TO REMOVE CONTAINERS FROM A SPLICE PLATE BETWEEN CONVEYORS

BACKGROUND OF THE INVENTION

1. Field of the Invention

The present invention relates generally to the field of conveyors, such as those used in the manufacture of cans and bottles. More specifically, the present invention discloses a pusher bar apparatus used to remove containers from a splice plate between adjacent conveyors.

2. Statement of the Problem

Conveyor lines are widely used, for example, in the beverage industry to transport containers, such as cans or bottles, within production facilities. Conveyor lines normally incorporate a sequence of stations for performing the various steps in manufacturing and filling containers. It is advantageous not to have to shut down the entire line if one of these stations breaks down or is otherwise taken off-line. This is conventionally accomplished by providing wide bi-directional conveyors between stations for temporary storage of containers, as shown generally in FIGS. 1 and 2. Each bi-directional conveyor 20 is typically mounted perpendicular to the main conveyor 10, with a splice plate 25 mounted to cover the gap between the conveyors 10, 20. If a downstream station goes off-line, containers will begin to accumulate on the main conveyor 10 until the back-up is detected by an optical sensor 16. This triggers the bi-directional conveyor 20 to run in the reverse direction (i.e., away from the main conveyor 10). The back-up of containers eventually builds to the point where containers overflow from the main conveyor 10, over the splice plate 25, and onto the bi-directional conveyor for temporary storage.

The process is reversed when the downstream station goes back on-line. A second sensor 14 detects when the main conveyor 10 has cleared to a point where the bi-directional conveyor 20 can reverse direction (i.e., toward the main conveyor 10) and begin to release stored containers back onto the main conveyor 10. A third sensor 24 detects when the bi-directional conveyor 20 has been emptied and shuts down the bi-directional conveyor 20. Any containers on the splice plate will normally stay there unless manually removed.

Governmental regulations and industry standards prohibit manufacturers from using containers that have been exposed to air-borne contaminants for extended periods of time. As a result, the normal practice in the beverage industry has been to discard or recycle any containers left standing on the splice plate at the end of the storage cycle. The splice plate is typically 16 to 18 feet long and 6 to 8 inches wide. Conventional beverage cans can be packed to a density of 22 cans per square foot. The storage cycle typically occurs about six times per hour in a conventional can line. Therefore, a substantial number of cans are needlessly discarded. Although the individual cost of each container may be only a few cents, the total cost of wasted cans over an extended period of months or years can be quite substantial. The environmental costs associated with recycling cans should also be considered in addition to the purely economic costs. Recycled cans are resmelted, which consumes natural resources in terms of fuel and electricity, and generates pollutants. Other types of containers are more difficult to recycle and are sometimes disposed of in landfills.

Pusher bars and other types of movable guides have been used in association with conveyor systems in the past in a wide variety of other applications, including the following:

| Inventor | Patent No. | Issue Date |
|---|---|---|
| Wolfe et al. | 3,442,401 | May 6, 1969 |
| Donner | 3,465,868 | Sept. 9, 1969 |
| Chalich | 3,669,241 | June 13, 1972 |

Chalich discloses a conveyor system that uses a bi-directional accumulating conveyor 20 for temporary storage of packages (e.g. bottles). The accumulating conveyor 20 includes a package stabilizing rail 61 to help maintain the packages in a desired orientation on the accumulating conveyor. The stabilizing rail 61 automatically moves with the accumulating conveyor 20 between two extreme positions as bottles are accumulated and then released to the main conveyor. The stabilizing rail 61 "is overlying the dead plate 28" (col. 7, lines 36–37) when all of the bottles have been returned to the chain conveyor 10. This suggests that the stabilizing rail serves to push the last bottles from the accumulating conveyor 20 over the dead plate (or splice plate) 28 and onto the main conveyor 10. However, the Chalich device uses an entirely different mechanism to accomplish this result. As shown in FIG. 4 of the Chalich patent, the stabilizing rail 61 rides on the accumulating conveyor 20 by means of two endless chains 73, 74 located on either side of the conveyor.

Wolfe et al. disclose equipment for palletizing excess cans from can supply equipment and for depalletizing these cans when later needed by can use equipment. A conveying system permits the movement of cans from the can supply equipment directly to the can use equipment under normal conditions, or to a palletizing station when there is an oversupply of cans from the can supply equipment. The conveying system also permits direct supply from the depalletizing station to the can use equipment when necessary. A can sweeping means 96 and can holding means 98 have downwardly-extending fingers 100 and 102 that are employed to advance groups of cans from the carriage 90 at the end of the conveyor 40 onto pallets 46 in the pallet zone 44. This process is reversed to depalletize containers.

Donner discloses an apparatus for forming a single-file column of bottles on an output conveyor. A combination backstopping bar and bottle guide 45 is movably mounted to relieve bottle jams that might occur when the bottles are formed into a single-file column.

3. Solution to the Problem

None of the prior art references uncovered in the search show a motor-drive pusher bar system for automatically pushing any containers left on the splice plate onto the main conveyor at the end of each storage cycle. This substantially eliminates the problems associated with wasted containers, as described above.

SUMMARY OF THE INVENTION

This invention provides an apparatus for removing containers from a splice plate between two conveyors. A sensor indicates when substantially all of the containers have moved from the first conveyor onto the splice plate. A pusher bar assembly is then activated by the sensor to push any remaining containers on the splice plate onto the second conveyor. In one embodiment, the pusher bar assembly includes a first pair of pulleys mounted above and adjacent to opposite ends of the splice plate that are driven by a motor, a second pair of pulleys mounted a predetermined horizontal distance from the first pulleys, a pair of belts extending around the first and second pulleys, and a pusher bar secured between the belts so that the pusher bar moves with the belts in a path extending around the pulleys. The upper portion of this path allows the pusher bar to be moved out of the way, so as not to interfere with passage of the containers over the splice plate during normal operation of the conveyors. However, when triggered by the sensor, the motor moves the pusher bar through the lower portion of its path around the pulleys to push the containers from the splice plate and onto the second conveyor.

A primary object of the present invention is to provide means to avoid wasting the containers that would otherwise be left standing on the splice plate.

Another object of the present invention is to reduce the costs of manufacturing and filling containers using conveyor lines.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIG. 3 is a vertical cross-sectional view of the bi-directional conveyor 20 showing the pusher bar 30 in its downward position.

FIG. 4 is a side view of the bi-directional conveyor 20 and pusher bar assembly. The main conveyor 10 is shown in vertical cross-section.

DETAILED DESCRIPTION OF THE INVENTION

Figure 1:
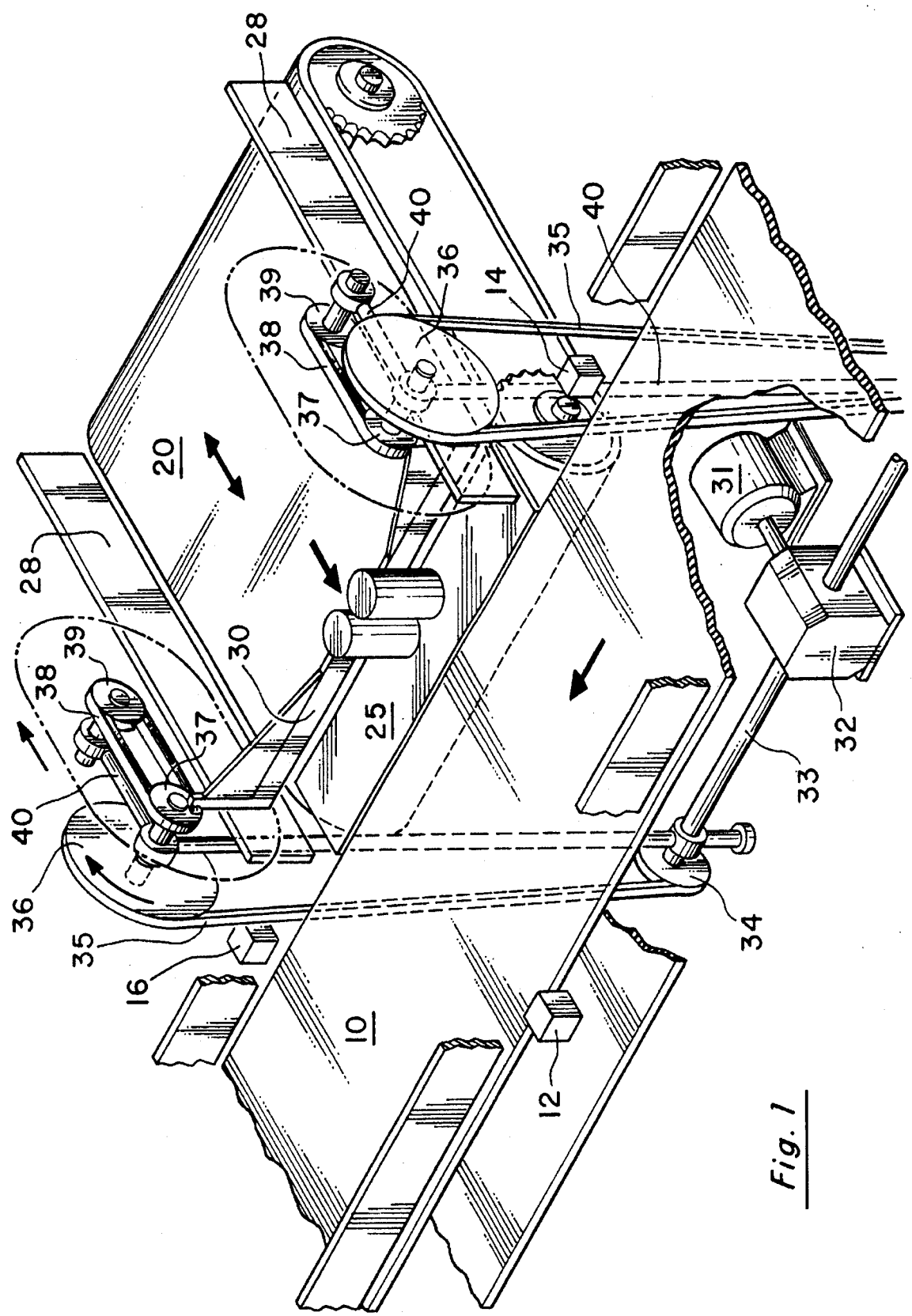
FIG. 1 is a perspective view of the present invention, including a main conveyor 10, bi-directional conveyor 20, splice plate 25, and pusher bar 30.
Figure 2:
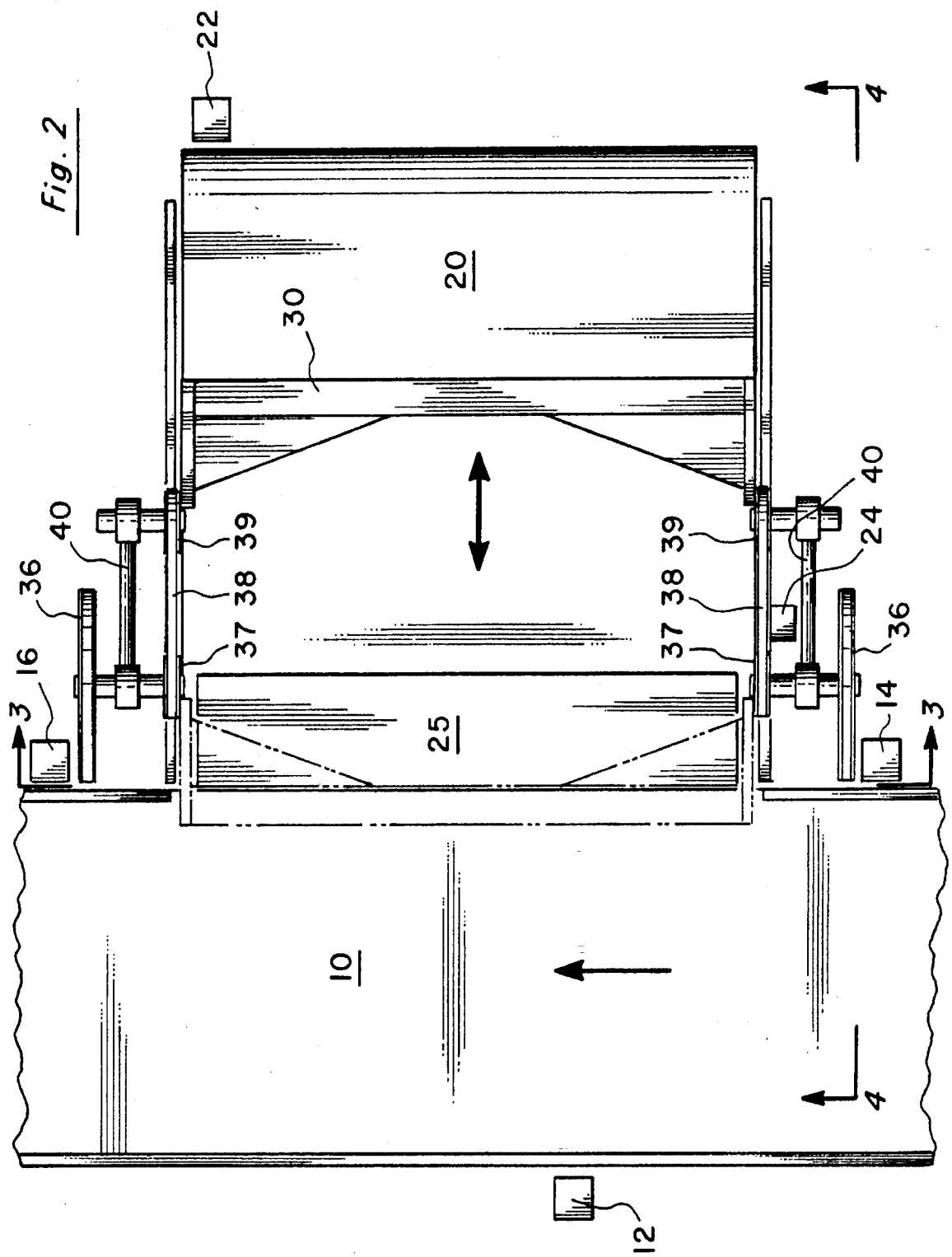
FIG. 2 is a top plan view of the present invention corresponding to FIG. 1.

Turning to FIGS. 1 and 2, a perspective view and a top plan view are provided showing the overall conveyor system, including a portion of the main conveyor 10, bi-directional conveyor 20, splice plate 25, and pusher bar 30. As previously discussed, the containers are normally transported along the main conveyor 10 in the direction indicated toward the next station on the conveyor line. The flow of containers is continually monitored by a series of optical sensors 16, 12, and 14 located along each segment of the main conveyor 10. If a downstream station goes off-line, containers will begin to accumulate on the main conveyor 10 until the back-up is detected by the sensor 16.

The bi-directional conveyor 20 is typically mounted perpendicular to the main conveyor 10 with a splice plate 25 mounted to cover the gap between the conveyors 10, 20. FIG. 3 is a vertical cross-sectional view of the bi-directional conveyor 20. FIG. 4 is a side view of the bi-directional conveyor 20 and pusher bar assembly 30 with the main conveyor 10 shown in vertical cross-section. When a back-up of containers on the main conveyor 10 is detected by the sensor 16, the bi-directional conveyor 20 begins to run in the reverse direction (i.e., away from the main conveyor 10). The back-up of containers eventually builds to the point where containers overflow from the main conveyor 10, over the splice plate 25, and onto the bi-directional conveyor 20 for temporary storage. At this point, the pusher bar 30 is held in its "up" or "inactive" position so as not to interfere with containers passing under the pusher bar 30 on the bi-directional conveyor 20, as will be described below in greater detail. Side stops 28 prevent containers from being pushed off the side edges of the bi-directional conveyor 20. Additional optical sensors 22 and 24 are used to detect when the bi-directional conveyor 20 is completely full of containers so that the bi-directional conveyor 20 can be temporarily shut down.

At some point, the downstream station will go back on-line and begin to use the containers on the main conveyor 10. The optical sensor 14 detects when the main conveyor 10 has cleared to a point where the bi-directional conveyor 20 can begin to release stored containers back onto the main conveyor 10. Again, the pusher bar remains in its inactive position, so as not to interfere with the passage of containers. The optical sensor 24 detects when the bi-directional conveyor 20 has been emptied of containers and shuts down the bi-directional conveyor 20. However, as previously explained, a number of containers will normally be left standing on the splice plate 25 between the main conveyor 10 and the bi-directional conveyor 20 at the end of this container return operation.

The pusher bar assembly 30 is shown in greater detail in FIGS. 3 and 4. In one embodiment, an electric motor 31 simultaneously provides power to mechanisms located at both sides of the bi-directional conveyor 20 by means of a differential 32 and drive shaft 33. A conventional stepper motor can be used for this purpose. The power is then delivered from the drive shaft 33 upward to the pusher bar assembly 30 via two pairs of pulleys 34 and 36 driven by a pair of belts 35 as illustrated in FIG. 3. Two additional pairs of pulleys 37 and 39 are mounted by a support 40 above the bi-directional conveyor 20 with a predetermined horizontal spacing between the set of pulleys 37, 39 on each side of the bi-directional conveyor 20, as shown in FIGS. 2 and 4. The first set of pulleys 37 is driven by the outer pulleys 36, and in turn drives the second set of pulleys 39 by means of a pair of belts 38.

A pusher bar 30 is secured between these belts 38 and extends across the width of the bi-directional conveyor 20 and splice plate 25 as shown in FIGS. 1 and 2. The pusher bar 30 moves with the belts 38 in a path extending around both sets of pulleys 37 and 39. The diameters of the pulleys 37 and 39 and their elevation above the splice plate 25 and the bi-directional conveyor 20 are carefully fixed. In particular, the upper portion of the path around the pulleys 37, 39 moves the pusher bar 30 above the containers, so as not to interfere with passage of the containers over the splice plate 25 and the bi-directional conveyor 20. The pusher bar is typically held in this "up" or "inactive" position while the main conveyor 10 is in normal operation, and while the containers are being stored or removed from the bi-directional conveyor 20. The range of motion of the pusher bar 30 along the lower portion of the path around the pulleys 37 and 39 is employed to push any remaining containers from the splice plate 25 and onto the main conveyor 10. The locations of pulleys 37, 39 and their relative spacing are largely determined by the dimensions and location of the splice plate 25, so that all containers can be removed from the splice plate 25 by the lower range of motion of the pusher bar 30. When the optical sensor 24 detects that substantially all of the containers have been emptied from the bi-directional conveyor 20 at the end of the container storage cycle, the motor 31 moves the pusher bar 30 from its inactive position through the range of motion extending along the lower portion of its path around the pulleys 37 and 39 to push any remaining containers from the splice plate 25 onto the main conveyor 10. As shown in FIGS. 1 and 2, the length of linkage connecting the pusher bar 30 to the belts 38 can also be changed to vary the radial offset between the upper and lower paths of the pusher bar 30 to accommodate different container sizes.

It should also be expressly understood that other types of linkage mechanisms could be employed to move the pusher bar from its inactive position and through the range of motion used to push the containers from the splice plate 25. For example, a single pair of large pulleys driven by a motor could be used to move the pusher bar in a circular path about a horizontal axis over the splice plate. Alternatively, a disk, wheel, or other linkage could be driven by the motor about a horizontal axis above the splice plate, with the pusher bar attached so that it follows a path that is radially offset relative to the horizontal axis. This disk, wheel, or linkage could be directly driven by the motor, or indirectly driven through a gear train.

In another embodiment, one or more pusher bars pivot about a vertical axis to push containers from the splice plate. For example, two pusher bars are mounted so that each pusher bar pivots about a vertical axis passing through one of the front corners of the splice plate (i.e., one of the two corners of the splice plate adjacent to the main conveyor). The length of each pusher bar is a little more than half the width of the bi-directional conveyor. In the inactive position, each pusher bar is held in a position flush against one of the side stops 28 of the bi-directional conveyor, so that the pusher bars do not interfere with passage of the containers over the bi-directional conveyor. When the time comes to sweep containers from the splice plate, the pusher bars are rotated toward one another through a 90-degree arc in a manner similar to some types of automobile windshield wipers. In their final positions at the end of this range of motion, the pusher bars lie along the front edge of the splice plate adjacent the main conveyor.

The preceding discussion has focused on use of the present invention in conjunction with temporary storage of containers on a bi-directional conveyor. However, it should be expressly understood that the present invention is in no way limited to this field of use. The present invention could be used in virtually any application in which a splice plate provides a transition between adjacent conveyors.

The above disclosure sets forth a number of embodiments of the present invention. Other arrangements or embodiments, not precisely set forth, could be practiced under the teachings of the present invention and as set forth in the following claims.

I claim:

1. An apparatus for removing containers from a splice plate between a first conveyor delivering containers to a second conveyor, said apparatus comprising:

a sensor indicating when substantially all of said containers have moved from said first conveyor onto said splice plate;

a pusher bar movably mounted across said splice plate, said pusher bar having a inactive position in which said pusher bar does not interfere with passage of said containers from said first conveyor over said splice plate to said second conveyor, and a pushing range of motion in which said pusher bar pushes any containers from said splice plate onto said second conveyor; and means for selectively moving said pusher bar from said inactive position through said pushing range of motion after said sensor indicates that substantially all of said containers have moved from said first conveyor.

2. The apparatus of claim 1, wherein said means for moving said pusher bar further comprise:

a motor; and linkage means driven by said motor about an axis substantially perpendicular to the direction of said first conveyor, for moving said pusher bar from said inactive position through said pushing range of motion along a path that is radially offset relative to said axis.

3. The apparatus of claim 2, wherein said linkage means comprise:

a first pulley driven by said motor;

a second pulley;

a belt extending around said first and second pulleys; and means for securing said pusher bar to said belt, thereby moving said pusher bar in a path extending around said first and second pulleys.

4. The apparatus of claim 3, wherein said path of said pusher bar around said first and second pulleys comprises an upper portion in which said pusher bar is above said containers, and a lower portion in which said pusher bar pushes said containers from said splice plate onto said second conveyor.

5. The apparatus of claim 1, wherein said means for moving said pusher bar further comprise:

a motor;

a first pair of pulleys driven by said motor, each mounted above and adjacent to opposite ends of said splice plate;

a second pair of pulleys, each mounted above and adjacent to opposite ends of said splice plate at a predetermined horizontal distance from said first pair of pulleys;

a pair of belts, each belt extending around a corresponding first pulley and second pulley; and means for securing said pusher bar between said belts so that said pusher bar moves with said belts in a path extending around said first and second pairs of pulleys.

6. The apparatus of claim 1, wherein said first conveyor comprises a bi-directional conveyor used for temporary storage of containers.

7. An apparatus for removing containers from a splice plate between a first conveyor delivering containers to a second conveyor, said apparatus comprising:

a sensor indicating when substantially all of said containers have moved from said first conveyor onto said splice plate;

a motor controlled by said sensor;

a pusher bar movably mounted across said splice plate; and linkage means driven by said motor for selectively moving said pusher bar from a position above said containers through a range of motion in which said pusher bar pushes any containers from said splice plate onto said second conveyor.

8. The apparatus of claim 7, wherein said linkage means moves said pusher bar along a path that is radially offset relative to an axis extending across said splice plate.

9. The apparatus of claim 7, wherein said linkage means further comprise:

a first pulley driven by said motor;

a second pulley;

a belt extending around said first and second pulleys; and means for securing said pusher bar to said belt, thereby moving said pusher bar in a path extending around said first and second pulleys.

10. The apparatus of claim 9, wherein said path of said pusher bar around said first and second pulleys comprises an upper portion in which said pusher bar is above said containers, and a lower portion in which said pusher bar pushes said containers from said splice plate onto said second conveyor.

11. The apparatus of claim 7, wherein said linkage means further comprise:

a first pair of pulleys driven by said motor, each mounted above and adjacent to opposite ends of said splice plate;

a second pair of pulleys, each mounted above and adjacent to opposite ends of said splice plate at a predetermined horizontal distance from said first pair of pulleys;

a pair of belts, each belt extending around a corresponding first pulley and second pulley; and means for securing said pusher bar between said belts so that said pusher bar moves with said belts in a path extending around said first and second pairs of pulleys.

12. The apparatus of claim 7, wherein said first conveyor comprises a bi-directional conveyor used for temporary storage of containers.

13. An apparatus for removing containers from a splice plate between a first conveyor delivering containers to a second conveyor, said apparatus comprising:

a sensor indicating when substantially all of said containers have moved from said first conveyor onto said splice plate;

a motor controlled by said sensor;

a first pair of pulleys driven by said motor, each mounted above and adjacent to opposite ends of said splice plate;

a second pair of pulleys, each mounted above and adjacent to opposite ends of said splice plate at a predetermined horizontal distance from said first pulleys;

a pair of belts, each belt extending around a corresponding first pulley and second pulley; and a pusher bar secured between said belts so that said pusher bar moves with said belts in a path extending around said first and second pairs pulleys, said path including an upper portion in which said pusher bar is above said containers and a lower portion in which said pusher bar pushes said containers from said splice plate onto said second conveyor.

14. The apparatus of claim 13, wherein said first conveyor comprises a bi-directional conveyor used for temporary storage of containers.

* * * * *